United States Patent
Chen et al.

(10) Patent No.: US 9,641,478 B2
(45) Date of Patent: *May 2, 2017

(54) NETWORKING ACTIVITY INTERACTIVE SYSTEM, COMPUTER READABLE RECORDING MEDIUM, CLIENT TERMINAL AND SERVER THEREOF

(71) Applicant: TENCENT TECHNOLOGY (SHENZHEN) COMPANY LIMITED, Shenzhen, Guangdong (CN)

(72) Inventors: Zhuo Chen, Guangdong (CN); Xuebao Fu, Guangdong (CN); Jiale Huang, Guangdong (CN); Li Liu, Guangdong (CN); Guosheng Chen, Guangdong (CN); Zhi Du, Guangdong (CN); Qiulei Zhu, Guangdong (CN); Wenqing Li, Guangdong (CN); Yun Zhang, Guangdong (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/874,074

(22) Filed: Oct. 2, 2015

(65) Prior Publication Data
US 2016/0028682 A1 Jan. 28, 2016

Related U.S. Application Data

(63) Continuation-in-part of application No. 13/672,442, filed on Nov. 8, 2012, now Pat. No. 9,184,927, which
(Continued)

(30) Foreign Application Priority Data

May 18, 2010 (CN) .......................... 2010 1 0184023

(51) Int. Cl.
*G06F 15/16* (2006.01)
*H04L 12/58* (2006.01)
(Continued)

(52) U.S. Cl.
CPC ........... *H04L 51/32* (2013.01); *G06Q 10/101* (2013.01); *G06Q 10/103* (2013.01); *H04L 12/1822* (2013.01); *H04L 61/2069* (2013.01)

(58) Field of Classification Search
CPC . H04L 51/32; H04L 61/2069; H04L 12/1822; G06Q 10/101; G06Q 10/103
See application file for complete search history.

(56) References Cited

U.S. PATENT DOCUMENTS

2003/0050977 A1  3/2003  Puthenkulam et al.

FOREIGN PATENT DOCUMENTS

| WO | 2007121191 A1 | 10/2007 |
| WO | 2009057144 A2 | 5/2009 |

OTHER PUBLICATIONS

European Search Report issued by the European Patent Office (EPO) dated Nov. 6, 2015 for EP2573984.

*Primary Examiner* — John MacIlwinen
(74) *Attorney, Agent, or Firm* — Tim Tingkang Xia, Esq.; Locke Lord LLP

(57) ABSTRACT

A networking activity interactive system includes: a creating module for creating networking activity contents; an interactive module for receiving requests for participating the networking activity and participant data submitted by a user, to ensure only participant data in conformity with the networking activity contents is added to the participant user group of the networking activity, and the user is added to the participant user group; a database for storing the networking activity contents, the participant user group of the networking activity, and the participant reply content volume; and a
(Continued)

presenting module for presenting the networking activity content and the participant reply content volume of the networking activity. Furthermore, a non-transitory computer readable recording medium, a client terminal and a server for networking activity interactive are also provided.

15 Claims, 8 Drawing Sheets

Related U.S. Application Data is a continuation of application No. PCT/CN2011/071235, filed on Feb. 24, 2011.

(51) Int. Cl.
  *H04L 29/12* (2006.01)
  *H04L 12/18* (2006.01)
  *G06Q 10/10* (2012.01)

NETWORKING ACTIVITY INTERACTIVE SYSTEM, COMPUTER READABLE RECORDING MEDIUM, CLIENT TERMINAL AND SERVER THEREOF

CROSS-REFERENCE TO RELATED APPLICATIONS

This application is a continuation-in-part of U.S. patent application Ser. No. 13/672,442, filed Nov. 8, 2012, now allowed, which itself is a continuation application of PCT application No. PCT/CN2011/071235, filed Feb. 24, 2011, which itself claims priority to Chinese Patent Application CN 201010184023.4, filed May 18, 2010. The disclosures of the above identified applications are hereby incorporated herein in their entireties by reference.

FIELD OF THE INVENTION

The present invention relates generally to computer technology, and more particularly, to a networking activity interactive system, computer readable recording medium, terminal client and server thereof.

BACKGROUND OF THE INVENTION

As the popularization of computers, information exchange becomes more and more convenient among people. People perform information interaction through the Social Networking Service (SNS). In an SNS community, people can create all kinds of groups through which users with same interests are convened. Furthermore, people can also post some networking activity information to assemble some other people to join the activity together. However, in a traditional SNS community, there is no criterion for the format of the activity contents created by a user. It only supports that people assemble some other people to join the activity. There are many kinds of activity contents with different formats. The contents replied by a user when he/she participates the networking activity are not very orderly and difficult to read and understand.

Therefore, a heretofore unaddressed need exists in the art to address the aforementioned deficiencies and inadequacies.

SUMMARY OF THE INVENTION

Therefore, one of the objectives of the present invention is to provide an interactive system of a networking activity which can make the activity content's format unified and easy to read.

In one aspect, the present invention is directed to a networking activity interactive system. In one embodiment, the networking activity interactive system includes a client terminal, a server in communication with the client terminal and comprising a computer processor and a non-transitory computer readable recording memory coupled to the computer processor and comprising such computer processor executable instructions which, when executed, cause the computer processor to implement a networking activity interactive method, by performing:

creating and storing networking activity contents, wherein the networking activity contents comprise an activity title, activity content, activity scheduled occurrence time, activity classification, participation conditions and activity examples; the detail procedure of determining whether the participant data submitted by the user is in conformity with the networking activity contents comprising: determining whether the participant data submitted by the user is in conformity with the participation conditions and the activity examples, if yes, storing the participant data submitted by the user into the participant reply volume of the networking activity, and adding the user into the participant user group of the networking activity;

receiving requests from a user for participating the networking activity and the participant data submitted by the user, determining whether the participant data submitted by the user is in conformity with the networking activity contents, if yes, adding the user into a participant user group of the networking activity and storing the participant data submitted by the user into a participant reply volume of the networking activity, if no, failing to participate the networking activity;

presenting the networking activity contents and the participant reply content volume of the networking activity;

assigning an identification code of the networking activity, an identification code of a group that a posting corresponding to the networking activity is disposed therein, and an identification code of the post;

indexed by the identification code of the networking activity, storing the networking activity contents, the participant user group of the networking activity, the identification code of the group and the identification code of the posting into an activity information storage module;

indexed by the identification code of the group and the identification code of the post, storing the posting title, the identification code of the networking activity, and the posting contents which comprising the activity example of the networking activity and the participant reply content volume which collects the participant data submitted by the user of the networking activity into a posting information storage module; and storing the networking activity created and participated by the user, and adding the networking activity created by the user into a networking activity creating volume of the user, adding the networking activity participated by the user into a networking activity participating volume.

In another aspect, the present invention is directed to a non-transitory computer readable recording medium that stores instructions which when executed by a computer comprising a processor implementing the forgoing networking activity interactive method.

In yet another aspect, the present invention is directed to a client terminal. In one embodiment, the client terminal includes:

a creating module comprising one or more processors configured to create networking activity contents, wherein the networking activity contents comprise an activity title, activity detail content, activity scheduled occurrence time, activity classification, participation conditions and activity examples, and wherein the interactive module further compares the participant data submitted by the user with the participation conditions and the activity examples;

an interactive module comprising one or more processors configured to receive requests from a user for participating the networking activity and participant data submitted by the user, and compare the participant data submitted by the user with the networking activity contents; and a presenting module comprising one or more processors configured to present the networking activity contents and the participant data submitted by the user when the participant data submitted by the user is in conformity with the networking activity contents according to the comparing result of the interactive module;

a reply module comprising one or more processors configured to receive normal reply contents submitted by the user for the networking activity contents; and a query module comprising one or more processors configured to inquire the networking activity contents and/or networking activity records of the user; wherein when the query module inquires the networking activity contents, the query module further receives the networking activity contents, the activity example of the corresponding networking activity, and the participant reply content volume of the networking activity, and presents them by the presenting module; and when the query module inquires the networking activity records of the user, the query module further receives the networking activity creating volume of the user and the networking activity volume participated by the user, and presents them by the presenting module.

In a further aspect, the present invention is directed to a server. In one embodiment, the server includes:

a database configured to store networking activity contents, a participant user group of the networking activity and a participant reply content volume which collects participant data submitted by a user; and an update module coupled to the database and configured to add the user into the participant user group of the networking activity, storing the participant data submitted by the user into the participant reply content volume of the networking activity, while the participant data submitted by the user is in conformity with the networking activity contents, wherein the database comprises:

an activity information storage module indexed by an identification code of the networking activity comprising one or more processors configured to store the networking activity contents, the participant user group of the networking activity, the identification code of a group and a identification code of a post;

a posting information storage module indexed by the identification code of the group and the identification code of the posting comprising one or more processors configured to store the posting title, the identification code of the networking activity and the posting contents which comprising the activity example of the networking activity and the participant reply content volume which collects the participant data submitted by the user of the networking activity; and a user activity storage module comprising one or more processors configured to store the networking activity created and participated by the user, add the networking activity created by the user into the networking activity creating volume of the user, and add the networking activity participated by the user into the networking activity participating volume of the user;

wherein the networking activity contents comprise an activity title, activity detail content, activity scheduled occurrence time, activity classification, participation conditions and activity examples.

The present interactive system and method, the client terminal and the server ensure that the participant data submitted by the user is in conformity with the created networking activity contents, and make the contents' format unified and easy to read, by creating networking activity contents, receiving participant data submitted by the user, determining whether the participant data submitted by the user is in conformity with the networking activity contents, if yes, adding the user into the participant user group of the networking activity, and storing the participant data of the user into the participant reply content volume of the networking activity.

And moreover, adopting the method of determining whether the participant data submitted by the user is in conformity with the participation condition and the format of the activity example, it will filter out irregular contents received and ensures the unified format of the participant contents submitted by the user. The operation is simple and convenient and the format is uniform and easy to deploy. By inquiring, user can receive the networking activity contents, choose to participate the networking activity and receive the networking activities participated and created by the user. The user's tendentiousness for things can be obtained by appraising the participant data submitted by the user.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DESCRIPTION OF THE PREFERRED EMBODIMENTS

Figure 1:
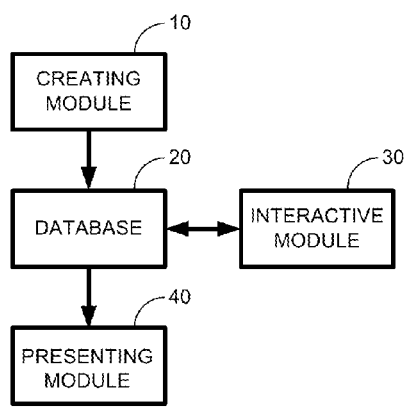
FIG. 1 is a block diagram illustrating a networking activity interactive system according to one embodiment of present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

The terms used in this disclosure generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in the disclosure, including examples of any terms discussed herein, is illustrative only, and in no way limits the scope and meaning of the disclosure or of any exemplified term. Likewise, the disclosure is not limited to various embodiments given in the disclosure.

As used in the disclosure herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The term "module", as used in the disclosure, may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. Each of the modules can operate individually and independently of other modules. Some or all of the modules can be executed on the same server or terminal. Some or all of the modules can be combined as one module. A single module can also be divided into sub-modules, each sub-module performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The term "server", as used in the disclosure, refers to a system that includes software and suitable computer hardware.

The term "database", as used in the disclosure, refers to a comprehensive collection of related data organized for convenient access, generally in a computing device.

As shown in FIG. 1, a networking activity interactive system includes a creating module 10, a database 20, an interactive module 30 and a presenting module 40.

The creating module 10 is configured to create networking activity contents and assigning an identification code of the networking activity, an identification code of a group and an identification code of a posting corresponding to the networking activity. The creating module 10 receives a request submitted by a user for creating the networking activity and the networking activity contents. The networking activity contents include an activity title, activity detail content, activity time, activity classification, participation conditions, activity examples and so on. After creating the networking activity successfully, the creating module 10 assigns an identification code for the networking activity. Furthermore, since the networking activity contents are presented as a post, the creating module 10 also assigns an identification code for a group that the posting corresponding to the networking activity is disposed therein and an identification code for the posting. Herein, the networking activity refers to an assembling action with a topic, time and content published via a networking platform, and other users can respond the assembling action on the network by signing up and participating in the assembling action. The group is a networking organization format founded by users who have the same or similar interests.

Figure 2:
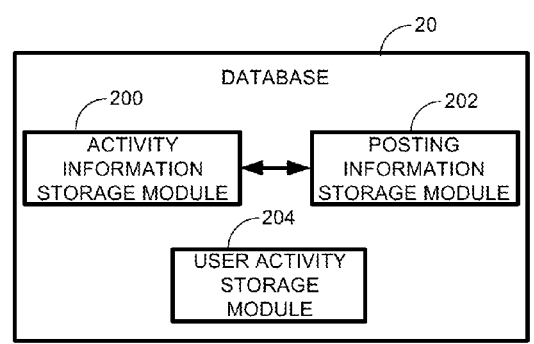
FIG. 2 is an internal block diagram illustrating a database according to one embodiment of present invention.

The database 20 stores the networking activity contents created and a participant user group of the networking activity. As shown in FIG. 2, the database 20 includes an activity information storage module 200, a posting information storage module 202 and a user activity storage module 204. Herein, indexed by the identification code of the networking activity, each record from the activity information storage module 200 stores the networking activity contents, including the activity title, the activity detail content, the activity time, the activity classification, the participation conditions, etc., and further stores the participant user group of the networking activity, the identification code of the group that the posting corresponding to the networking activity is disposed therein, the identification code of the posting, and so on. Indexed by the identification code of the group that the posting corresponding to the networking activity is disposed therein and the identification code of the posting, each record of the posting information storage module 202 stores information such as a posting title, the identification code of the networking activity, posting contents, and so on. Herein, the posting contents include an activity example and a participant reply content volume which collects participant data submitted by the user of the networking activity. In the present embodiment, the activity example in the posting contents exists as a sequencing character string. The sequencing is a process for transforming the status information of the object, such as the activity example, into a window body which can be stored and transmitted, namely a process for transforming the object into the character string and easy for storing. Furthermore, reverse-sequencing is a reversed process of sequencing. The user activity storage module 204 stores the networking activity created and participated by the user, and adds the created networking activity into a networking activity creating volume and a networking activity participating volume of the user. The networking activity creating volume of the user is to collect all networking activities created by the user, for example, to present the networking activity creating volume of the user as a list. The networking activity participating volume of the user is similar to the networking activity creating volume.

Furthermore, the creating module 10 receives a request for creating a networking activity and the networking activity contents submitted by a user, and submits the networking activity contents submitted by the user to the activity information storage module 200 and the posting information storage module 202, and determines whether there is a cross-check relationship between the activity information storage module 200 and the posting information storage module 202 for the networking activity contents. If yes, the networking activity is added into the networking activity creating volume of the user of the user activity storage module 204. If no, the creating module 10 re-submits the networking activity contents to the activity information storage module 200 and the posting information storage module 202. Here, the cross-check relationship means that a user can receive all contents of the networking activity by submitting the identification code of the networking activity or the identification code of the group that the posting corresponding to the networking activity is disposed therein and the identification code of the posting.

The interactive module 30 receives a request for participating the networking activity submitted by a user and participant data submitted by the user, and determines whether the participant data is in conformity with the networking activity contents. If yes, the user is added into the participant user group of the networking activity and the participant data submitted by the user are stored into the participant reply content volume of the networking activity. Here, the participant data submitted by the user include the personal information of the user and the participant contents. The submitted participant data are the participant reply contents of the networking activity. The participant reply content volume of the networking activity is a volume of the participant data submitted by all users. The detail process of determination is: from the activity information storage module 200, the interactive module 30 receives the participation condition and the required information of the networking activity of the corresponding request submitted by the user for participating the networking activity, and determines whether the personal information of the user is in conformity with the requirement for participating the networking activity. If yes, interactive module 30 receives the activity example of the corresponding networking activity from posting information storage module 202. If no, the participant of the user is unsuccessful. After receiving the activity example, the interactive module 30 determines whether the participant data submitted by the user is in conformity with the format of the activity example. If yes, the participant data submitted by the user are sequenced and stored into the posting information storage module 202, and the user is added into the participant user group of the networking activity of the activity information storage module 200, and the networking activity is stored into the user activity storage module 204 and added into the networking activity participating volume of the user. After reverse-sequencing the participant data which are submitted by the user and stored as sequencing character strings, the posting information storage module 202 presents the participant data and the identification code of the networking activity in a new reply of the posting of the corresponding networking activity via presenting module 40, and identifies the participant contents submitted by the user by special identification. The special identification is to set a default field in a posting information database for reply, wherein 0 in the default field means a normal reply from the user for the networking activity and 1 in the default field means a participant reply from the user for the networking activity.

The presenting module 40 is configured to present the networking activity contents and the participant reply content volume of the networking activity. In the present embodiment, the networking activity and the participant contents submitted by the user are presented as a posting.

In order to clearly illustrate the application of the networking activity interactive system, the following networking activity named "Dedicating to the Mother's Day, I have an appointment with children" is described in detail.

The creating module 10 creates networking activity contents, such as: the activity title is "Dedicating to the Mother's Day, I have an appointment with children"; the activity detail contents is "Around Mother's Day, write a short story about you and children (more than 150 words), provide 5 or more pictures about mother and children (clear and beautiful)"; the activity time is "Before 9th May"; the activity classification is "literature"; the participation condition is "anyone who meets the entry conditions can apply to participate"; the activity example is "the title and the address of the composition posting of the activity should be included and replied in the activity postings"; the identification code of the networking activity is "01"; the identification code of the group that the posting corresponding to the networking activity is disposed therein is "02"; the identification code of the posting is "022".

The creating module 10 submits and stores the contents, "Dedicating to the Mother's Day, I have an appointment with children", to the activity information storage module 200 and the posting information storage module 202. The creating module 10 also creates a cross-check relationship between the activity information storage module 200 and the posting information storage module 202, thus the user can inquire all information about "Dedicating to the Mother's Day, I have an appointment with children" from the activity information storage module 200 and the posting information storage module 202 by the identification code of networking activity, which is "01", or the identification code of the group that the posting corresponding to the networking activity is disposed therein, which is "02", or the identification code of the post, which is "022". After creating the cross-check relationship successfully, the networking activity "Dedicating to the Mother's Day, I have an appointment with children" is stored into the user activity storage module 204 and added into the networking activity creating volume of the user.

After receiving the participant data which is "[Mother's Day] My baby can sing and dance http://abc.abc.com/abc.html" submitted by a user named "snowing", the interactive module 30 compares the participant data with the networking activity contents. Since the participant data is consistent with the requirement of the participation condition and the activity example's format of the networking activity, the user "snowing" is added into the participant user group of the networking activity "Dedicating to the Mother's Day, I have an appointment with children", and the participant data submitted by "snowing" are added into the participant reply content volume of the networking activity.

The presenting module 40 presents the networking activity contents of "Dedicating to the Mother's Day, I have an appointment with children" and the participant data submitted by "snowing", which is "[Mother's Day] My baby can sing and dance http://abc.abc.com/abc.html".

Figure 3:
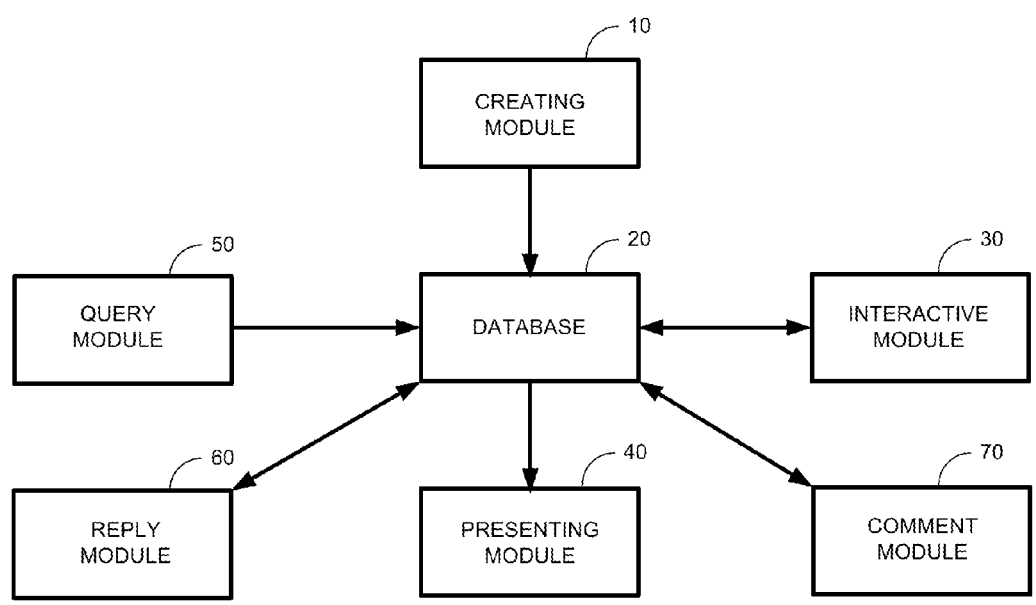
FIG. 3 is a block diagram illustrating a networking activity interactive system according to another embodiment of present invention.

As shown in FIG. 3, in an embodiment, the present networking activity interactive system further includes a query module 50 configured to inquire the networking activity contents and/or networking activity records of the user. After receiving a user's request about browsing networking activity contents, the query module 50 obtains the corresponding networking activity contents from the activity information storage module 200, and obtains the activity example of the corresponding networking activity from the posting information storage module 202 and the participant reply content volume of the networking activity, and then presents via the presenting module 40.

In the embodiment, the present networking activity interactive system further includes a reply module 60 and a comment module 70.

The reply module 60 obtains the normal reply contents submitted by the user about the networking activity contents, that is, the normal reply contents don't need to be determined by the interactive module 30. After receiving the normal reply contents submitted by the user, the reply module 60 stores them into the posting information storage module 202, and appends a record in the reply list of the posting of the corresponding networking activity. Herein, the normal reply contents are the replies published by the user who doesn't sign up and participate in the networking activity, that is, the text contents submitted by the user.

The comment module 70 is for receiving the comment contents of the participant data submitted by the user in the participant reply volume of the networking activity, storing the comment contents into the posting information storage module 202, and presenting the comment contents by the presenting module 40. In the embodiment, there are two fields in comment module 70 which are "great" and "don't like". When a user reads the participant reply contents of the networking activity of the participant user, he/she can click the options of "great" or "don't like" to appraise the participant reply contents. The comment module 70 stores the comment contents, increases by one for a counter of the corresponding option, and stores the counter of the corresponding option back into the posting information storage module 202.

Figure 4:
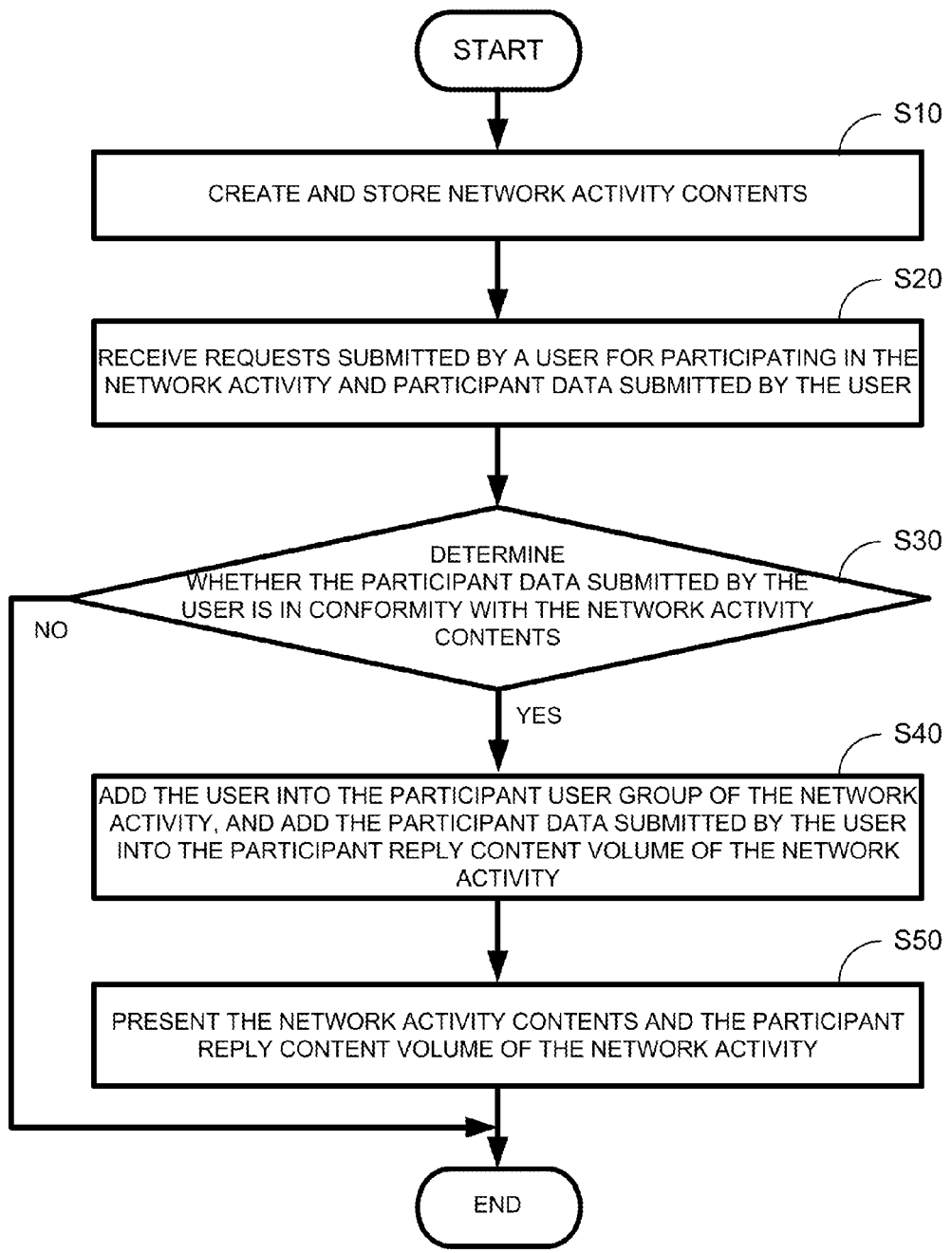
FIG. 4 is a flow chart illustrating a networking activity interactive method according to one embodiment of present invention.

In one embodiment, as shown in FIG. 4, a networking activity interactive method, includes the following steps:

Step S10: creating and storing networking activity contents. Via the creating module 10, a user submits a request for creating networking activity and the networking activity contents including, among other things, an activity title, activity detail content, activity time, activity classification, participation conditions and activity examples, and so on.

When creating a networking activity, the method further includes: assigning an identification code of the networking activity, an identification code of a group that the posting corresponding to the networking activity is disposed therein, and an identification code of the posting; indexed by the identification code of the networking activity, storing the networking activity contents, the participant user group of the networking activity, the identification code of the group that the posting corresponding to the networking activity is disposed therein and the identification code of the posting into the activity information storage module 200; indexed by the identification code of the group and the post, storing the posting title, the identification code of the networking activity and the posting contents which comprise the activity example of the networking activity and the participant reply content volume which collects the participant data submitted by the user of the networking activity into the posting information storage module 202; storing the networking activity created and participated by the user, and adding the networking activity created by the user into the networking activity creating volume of the user of the user activity storage module 204, adding the networking activity participated by the user into the networking activity participating volume of the user activity storage module 204.

Step S20: receiving requests from a user for participating in the networking activity and participant data submitted by the user. When participating in a networking activity, the user needs to submit corresponding participant data. The participant data submitted by the user include the personal information and the participant contents. The personal information is for determining whether the user has the permission to participate in the networking activity. The format of participant data is the same as the networking activity example such as that the personal information of the user comprises a personal email address, and so on. Furthermore, the participant data submitted by the user when the user participates in the networking activity are called as participant reply contents.

Step S30: determining whether the participant data submitted by the user is in conformity with the networking activity contents; if yes, proceeding to step S40, if no, ending the procedure. In the present embodiment, the procedure of determining whether the participant data submitted by the user is in conformity with the networking activity contents is: determining the participant data submitted by the user is in conformity with the participation conditions and the activity contents of the networking activity, if yes, proceeding to step S40, if no, ending the procedure.

Step S40: adding the user into the participant user group of the networking activity, and adding the participant data submitted by the user into the participant reply content volume of the networking activity. If the participant data submitted by the user meets the requirement, the user will be added into the participant user group of the networking activity, and the participant data submitted by the user will be stored into the participant reply content volume of the networking activity in the database.

Step S50: presenting the networking activity contents and the participant reply content volume of the networking activity. It's convenient for users to understand and participate by presenting the networking activity contents. To present the participant reply content volume which collects the participant data submitted by the user indicates that the user participates successfully, and the user can inquire and read it. The networking activity contents and the participant data submitted by the user are presented as a posting.

Here is an example for creating a networking activity, for example: the activity title is "Dedicating to the Mother's Day, I have an appointment with children"; the activity detail content is "Around Mother's Day, write a short story about you and children (more than 150 words), provide 5 or more pictures about mother and children (clear and beautiful)"; the activity time is "Before 9th May"; the activity classification is "literature"; the participation condition is "anyone who meets the entry conditions can be applied to participate"; the activity example is "reply the address of the of the composition posting of the activity in the activity post".

The one or more methods can be implemented by modules described herein. The modules can be implemented as hardware components, software modules, or any combination thereof. For example, the modules described can be software modules implemented as instructions on a non-transitory memory capable of being executed by a processor or a controller on a machine described in FIG. 10.

Figure 5:
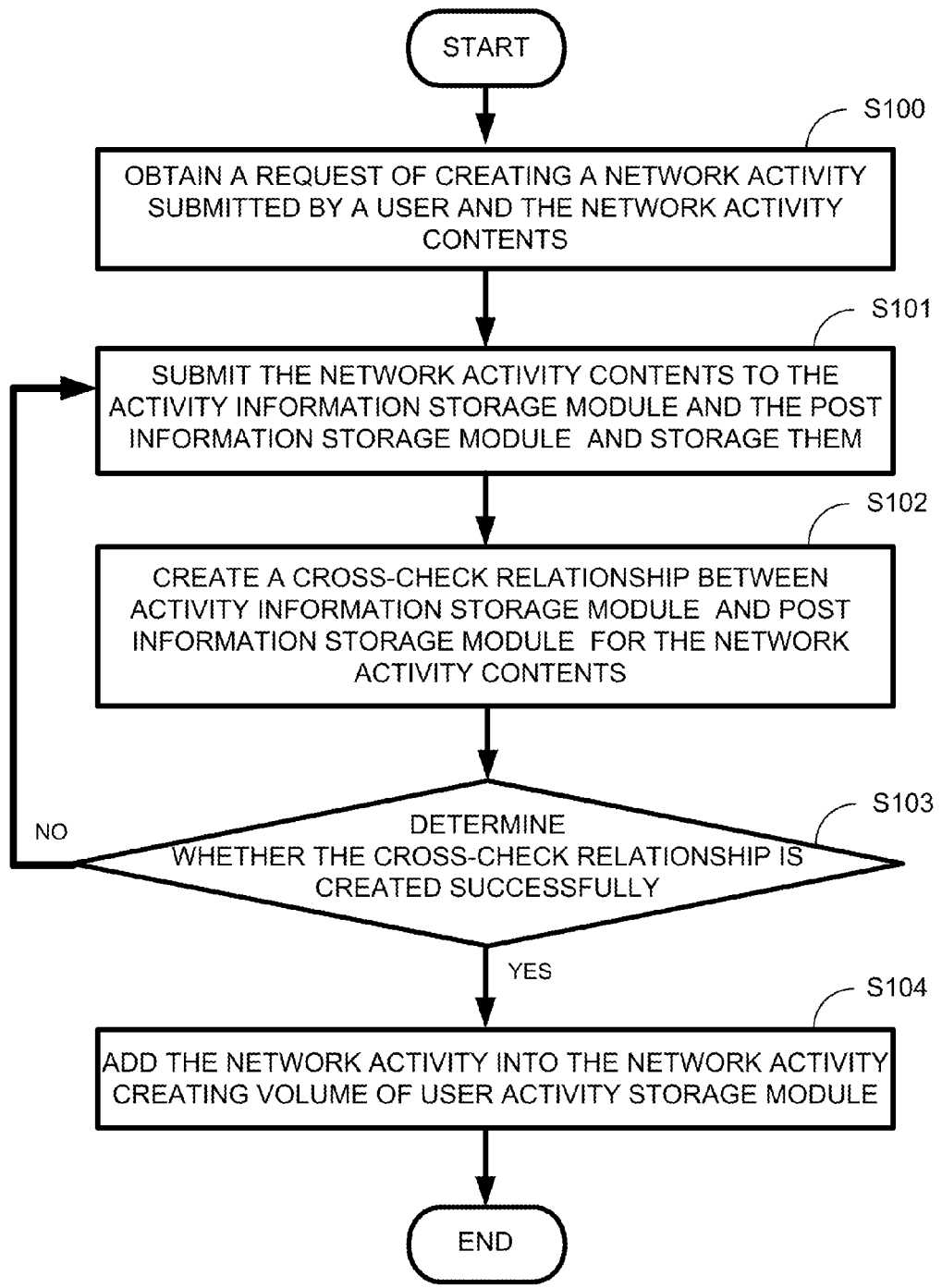
FIG. 5 is a flow chart illustrating a method of creating networking activity contents according to one embodiment of present invention.

In one embodiment, as shown in FIG. 5, the procedure of creating networking activity contents includes:

Step S100: receiving a request of creating a networking activity submitted by a user and the networking activity contents such as the present networking activity contents "Dedicating to the Mother's Day, I have an appointment with children".

Step S101: submitting the networking activity contents to the activity information storage module 200 and the posting information storage module 202 and storing them. The received networking activity contents are submitted to the activity information storage module 200 and the posting information storage module 202 for storing.

Step S102: creating a cross-check relationship between the activity information storage module 200 and the posting information storage module 202 for the networking activity contents. All corresponding information of the networking activity contents can be inquired in the activity information storage module 200 and the posting information storage module 202. In the activity information storage module 200, the networking activity contents, the participant user group of the networking activity, the identification code of the group and the identification code of the posting of the correspond networking activity are stored and indexed by the identification code of the networking activity. In the posting information storage module 202, the posting title, the identification code of the networking activity and the posting contents which comprise the activity example of the networking activity and the participant reply content volume which collects the participant data submitted by the user of the networking activity are stored and indexed by the identification code of the group and the identification code of the posting.

Step S103: determining whether the cross-check relationship is created successfully, if yes, proceeding to step S104, if no, going back to step S101. To determine whether the networking activity contents can be cross-checked between the activity information storage module 200 and the posting information storage module 202 means that a user can obtain all contents of the networking activity when the user submits the identification code of the networking activity or the identification code of the group that the posting corresponding to the networking activity is disposed therein and the identification code of the posting. If creating the cross-check relationship unsuccessfully, the networking activity contents should be re-submitted to the activity information storage module 200 and the posting information storage module 202 for storing again; and the cross-check relationship should be re-created.

Step S104: adding the networking activity into the networking activity creating volume of the user activity storage module 204. The user activity storage module 204 stores the networking activity, and adds the networking activity into the network creating volume of the user.

In an embodiment, the present networking activity interactive method further includes receiving the normal reply contents submitted by the user about the networking activity contents, and storing and presenting the normal reply contents. The normal reply contents are the text reply contents published by the user who didn't sign up and participate in the networking activity. For example, in the present activity "Dedicating to the Mother's Day, I have an appointment with children", since a user directly replies "Thanks, Mother" which is not a reply following the activity example, the reply contents are the normal reply contents.

Figure 6:
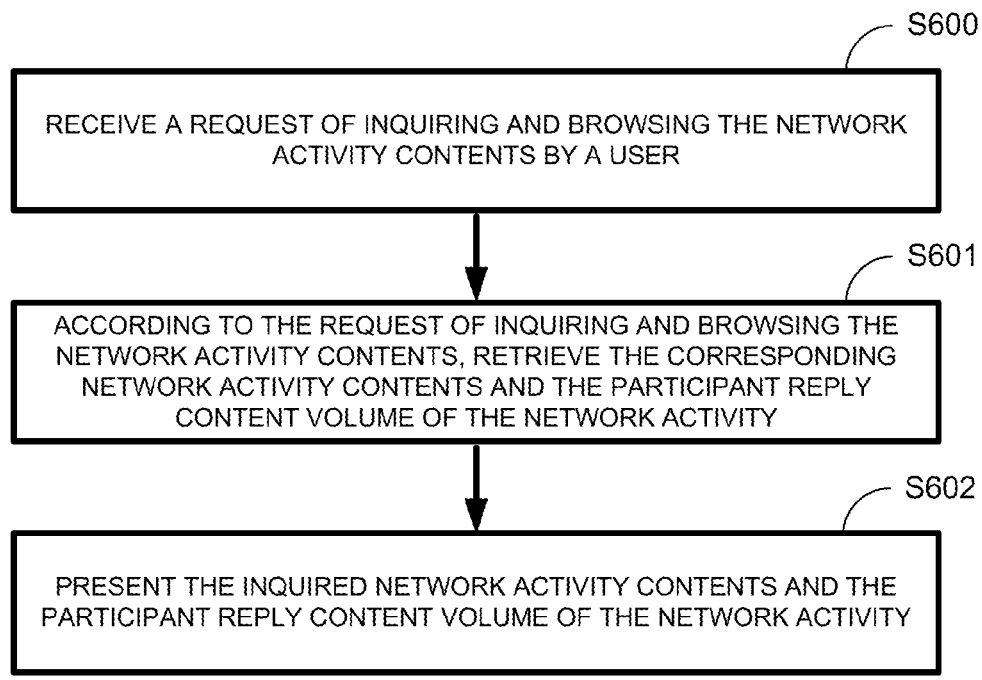
FIG. 6 is a flow chart illustrating a method of inquiring networking activity contents according to one embodiment of present invention.

The present interactive method also includes a step of inquiring the networking activity contents and/or the networking activity records of the user. As shown in FIG. 6, the step of inquiring the networking activity contents includes:

Step S600: receiving a request of inquiring and browsing the networking activity contents by a user. The user submits a request of inquiring and browsing the networking activity contents via query module 50.

Step S601: according to the request of inquiring and browsing the networking activity contents, receiving the corresponding networking activity contents and the participant reply content volume of the networking activity. Through the request of inquiring and browsing the networking activity contents, the query module 50 obtains the corresponding networking activity contents and the participant reply content volume of the networking activity from the activity information storage module 200 and the posting information storage module 202. Furthermore, if the participant reply content volume of the networking activity is stored as a sequencing character string, the obtained participant reply content volume will be reverse-sequenced.

Step S602: presenting the inquired networking activity contents and the participant reply content volume of the networking activity.

Figure 7:
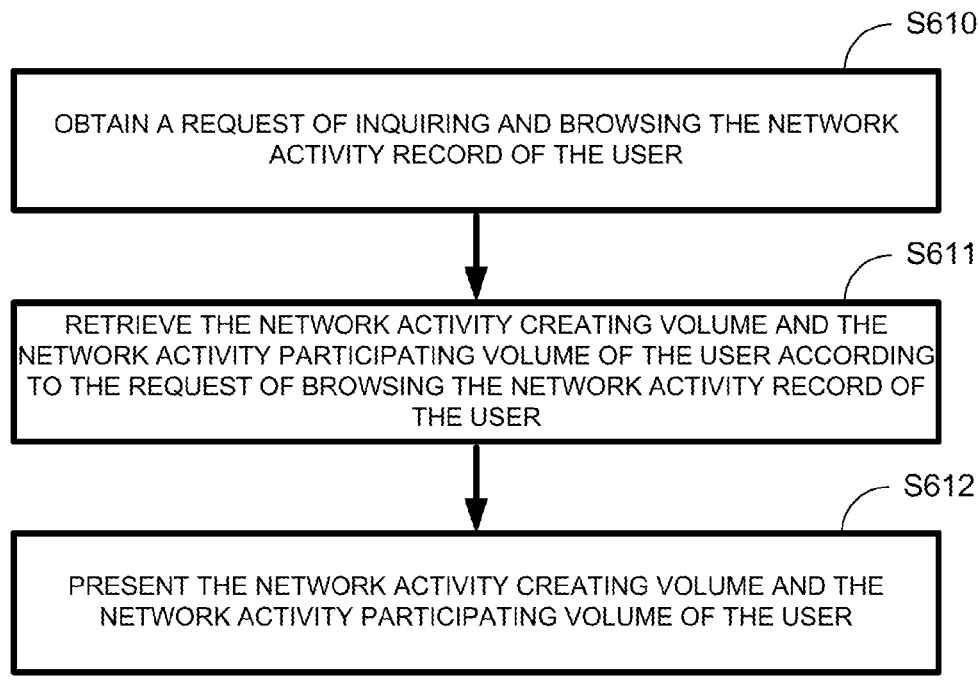
FIG. 7 is a flow chart illustrating a method of inquiring networking activity records of the user according to one embodiment of present invention

In one embodiment, as shown in FIG. 7, the procedure of inquiring the networking activity record of the user includes:

Step S610: receiving a request of inquiring and browsing the networking activity record of a user. The user submits a request of inquiring and browsing the networking activity record of the user via query module 50.

Step S611: receiving the networking activity creating volume and the networking activity participating volume of the user according to the request of browsing the networking activity record of the user. According to the request of browsing the networking activity record of the user, the query module 50 obtains the corresponding networking activity creating volume and the networking activity participating volume of the user from the user activity storage module 204.

Step S612: presenting the networking activity creating volume and the networking activity participating volume of the user.

The present networking activity interactive method also includes the steps of receiving the comment contents of the participant data submitted by the user in the participant reply volume of the networking activity, and storing and presenting the comment contents. A user may appraise the participant reply of the networking activity of other users through the comment module.

Figure 8:
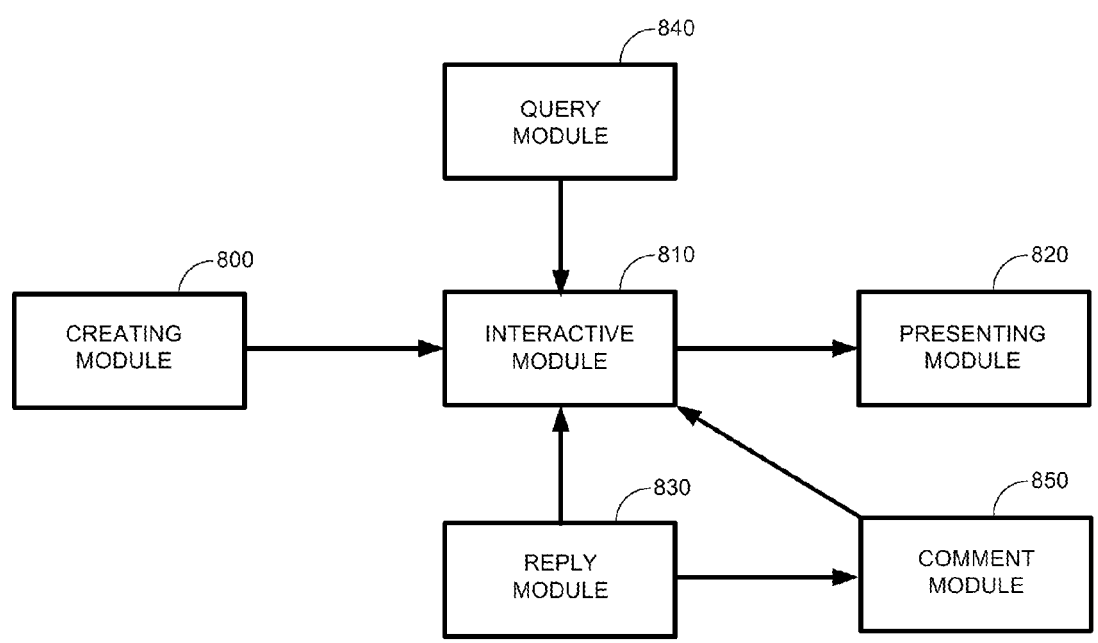
FIG. 8 is an internal block diagram illustrating a client terminal according to one embodiment of present invention.

In one embodiment, as shown in FIG. 8, a client terminal includes a creating module 800, an interactive module 810, a presenting module 820, a reply module 830, a query module 840 and a comment module 850.

The creating module 800, which may include one or more processors, is configured to create networking activity contents and assigning an identification code of the networking activity, an identification code of a group that the posting corresponding to the networking activity is disposed therein, and an identification code of the posting. The creating module 800 receives a request submitted by a user of creating the networking activity and the networking activity contents. The networking activity contents include, among other things, an activity title, activity detail contents, activity time, activity classification, participation conditions, activity examples, and so on. After successfully creating the networking activity, the creating module 800 also assigns an identification code for the networking activity. Furthermore, since the networking activity contents are presented as a posting, the creating module 800 assigns the identification code of the group that the posting corresponding to the networking activity is disposed therein and the identification code of the posting as well.

The interactive module 810, which may include one or more processors, is for receiving a request for participating in the networking activity and the participant data submitted by a user, and comparing the participant data submitted by the user with the networking activity contents. The participant data submitted by the user includes personal information of the user and the participant contents. By comparing the participant data submitted by the user with the networking activity contents obtained from a server by the client terminal, it can determine whether the participant data submitted by the user is in conformity with the networking activity contents. Since the networking activity contents include activity titles, activity detail contents, activity time, activity classification, participation conditions and activity examples, the interactive module 810 further compares the participant data with the participation conditions and the activity examples.

The presenting module 820, which may include one or more processors, is for presenting the networking activity contents and the participant data submitted by the user when the participant data submitted by the user is in conformity with the networking activity contents according to the comparing result of the interactive module 810.

The reply module 830, which may include one or more processors, is configured to receive the normal reply contents about the networking activity submitted by the user.

The query module 840, which may include one or more processors, is configured to inquire the networking activity contents and/or the networking activity records of a user. While inquiring the networking activity contents, the query module 840 further obtains the networking activity contents, the activity example of the corresponding networking activity and the participant reply content volume of the networking activity, and presents them via the presenting module 820. While inquiring the networking activity records of a user, the query module 840 also receives the networking activity creating volume and the networking activity participating volume of the user and presents them through presenting module 820.

The comment module 850, which may include one or more processors, is configured to receive comment contents of the participant data submitted by the user in the participant reply volume of the networking activity and presenting the comment contents via the presenting module 820.

Figure 9:
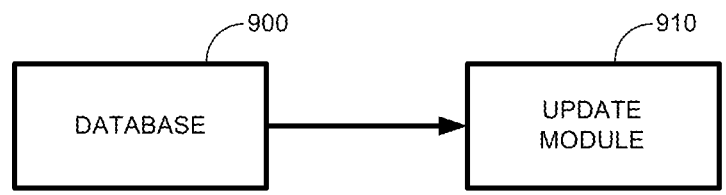
FIG. 9 is an internal block diagram illustrating a server according to one embodiment of present invention.

In one embodiment, as shown in FIG. 9, a server includes a database 900 and an update module 910.

The database 900 is configured to store the networking activity contents, the participant user group of networking activity and the participant reply content volume which collects the participant data submitted by the user.

The update module 910 coupled to the database and is configured to add a user into the participant user group of the networking activity, storing the participant data submitted by the user into the participant reply content volume of the networking activity, while the participant data submitted by the user is in conformity with the networking activity contents.

In a preferred embodiment, the database 900 includes an activity information storage module, a posting information storage module and a user activity storage module, each of which may include one or more processors. Indexed by the identification code of the networking activity, the activity information storage module stores the networking activity contents, the participant user group of networking activity, the identification code of a group and the identification code of a post; indexed by the identification code of the group and the identification code of the post, the posting information storage module stores the posting title, the identification code of networking activity and the posting contents which include the activity example of the networking activity and the participant reply content volume which collects the participant data submitted by a user of the networking activity; the user activity storage module stores the networking activity created and participated by a user, and adds the networking activity created by the user into the networking activity creating volume of the user, adds the networking activity participated by the user into the networking activity participating volume. A cross-check relationship is created between the activity information storage module and the posting information storage module.

Figure 10:
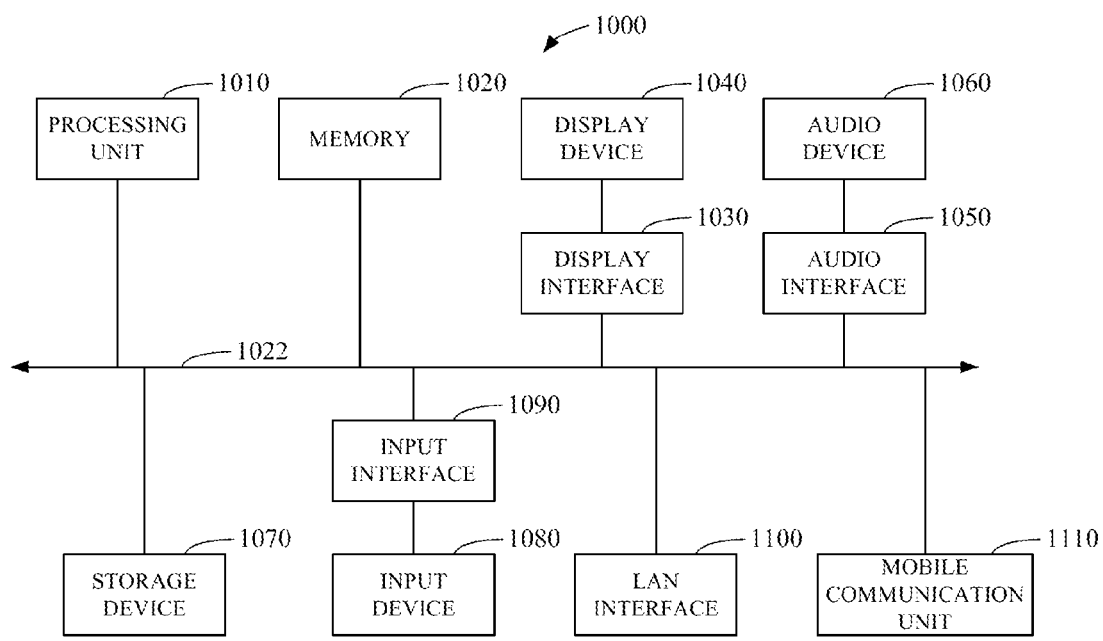
FIG. 10 shows a system block diagram of a computing system on which embodiments of the invention may be implemented.

FIG. 10 shows a system block diagram of a computing system 1000 on which embodiments of the invention may be implemented. The computing system 1000 is only one example of a suitable computing environment and is not intended to suggest any limitation as to the scope of use of the invention. Neither should the computing system 1000 be interpreted as having any dependency or requirement relating to any one or combination of components illustrated in the exemplary computing system 1000.

The computing system 1000 shown in FIG. 10 is an example of a computer system, either a terminal or a server, suitable for use with the invention. Other architectures having different configurations of subsystems can also be utilized. Examples of well-known computer systems may be suitable for use with embodiments of the invention include, but are not limited to, desktop computers, laptop computers, personal digital assistants, smart phones, tablet computers, portable media players, set top boxes, and the like.

As in FIG. 10, the computing system 1000 includes a processing unit 1010, a memory 1020, and a system bus 1022 that couples various system components including the memory 1020 to the processing unit 1010. The processing unit 1010 is a hardware that carries out the instructions of a computer program by performing the basic arithmetical and logical operations of the computer system. The memory 1020 is a physical device used to store computer program or data (e.g. program state information) on a temporary or permanent basis. The system bus 1022 may be any of several types of bus structures including a memory bus or memory controller, a peripheral bus, and a local bus. The system bus 1022 allows data communication between the processing unit 1010 and the memory 1020, which may include read-only memory (ROM) or flash memory (neither shown), and random access memory (RAM) (not shown). The RAM is generally the main memory into which the operating system and application programs are loaded.

The computing system 1000 further includes a display interface 1030 (e.g., graphic processing unit), a display device 1040 (e.g., liquid crystal display device), an audio interface 1050 (e.g., sound card), and an audio device 1060 (e.g., speaker). The display device 1040 and the audio device 1060 are media devices used to experience multimedia content.

The computing system 1000 typically includes a storage device 1070. The storage device 1070 may be selected from a variety of computer readable media. The computer readable media can be any available media that can be accessed by the computing system 1000 and includes both removable and non-removable media. By way of example, computer readable media includes, but is not limited to, flash memory (e.g., micro SD card), CD-ROM, digital versatile disks (DVD) or other optical disk storage, magnetic cassettes, magnetic tape, magnetic disk storage or other magnetic storage devices, or any other medium which can be used to store the desired information and which can accessed by the computing system 1000.

The computing system 1000 further includes an input device 1080 and an input interface 1090 (e.g., IO controller). A user may enter commands and information into the computing system 1000 through the input device 1080 such as a keyboard, a mouse, a touch panel disposed on the display device 1040. The input device 1080 is often connected to the processing unit 1010 through the input interface 1090 that is coupled to the system bus 1022, but may be connected by other interface and bus structures, such as a universal serial bus (USB).

The computing system 1000 may operate in a networked environment using logical connections to one or more network devices. The network device may be a personal computer, a server, a router, a smart phone, a tablet computer or other common network node. The computing system 1000 connects the network device via a local area network (LAN) interface 1100 or a mobile communication unit 1110. A local area network (LAN) is a computer network that interconnects computers in a limited area such as a home, school, computer laboratory, or office building using network media. Ethernet over twisted pair cabling, and Wi-Fi are the two most common technologies currently used to build LANs. Wi-Fi is a technology that allows the computing system 1000 to exchange data or connect to the internet wirelessly using radio waves. The mobile communication unit 1110 can make and receive telephone calls over a radio link while moving around a wide geographic area. In addition to telephony, the mobile communication unit 1110 also supports internet access by providing mobile data service on the 2G, 3G, or 4G cellular communication system.

It should be noted that, in other computing systems suitable for use with the invention, the computing system may include additional or fewer subsystems. For example, another computing system could include a Bluetooth unit for exchanging data over short distances, an image sensor for photography, and an accelerometer for measuring acceleration.

As described in detail above, the computing system 1000, consistent with the present invention, perform certain operations for the above process for displaying micro-blog message. The computing system 1000 may perform these operations in response to the processing unit 1010 executing software instructions contained in the computer readable media. The software instructions may be read into the memory 1020 from the storage device 1070, or from another device via the LAN interface 1100. The software instructions contained in the memory 1020 causes the processing unit 1010 to perform the process for displaying micro-blog message as described above. Alternatively, hardwired circuitry may be used in place of or in combination with software instructions to implement processes consistent with the present invention. Thus, the present invention is not limited to any specific combination of hardware circuitry and software.

The present interactive system and method, the client terminal and the server ensure that the participant data submitted by the user is in conformity with the created networking activity contents, and make the contents' format unified and easy to read, by creating networking activity contents, receiving participant data submitted by the user, determining whether the participant data submitted by the user is in conformity with the networking activity contents, if yes, adding the user into the participant user group of the networking activity, and storing the participant data of the user into the participant reply content volume of the networking activity.

And moreover, adopting the method of determining whether the participant data submitted by the user is in conformity with the participation conditions and the format of the activity examples, it will filter out irregular contents received and ensures the uniform format of the participant contents submitted by users. The operation is simple and convenient and the format is uniform and easy to deploy. By inquiring, users can receive networking activity contents, choose to participate in the networking activity and receive the networking activities participated and created by the user. The user's tendentiousness for things can be obtained by appraising the participant data submitted by the user.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The steps of the method or algorithm according to the embodiments disclosed in this specification can be implemented by hardware or a software module executed by a processor, or implemented by a combination thereof. The software module may be stored in a random access memory (RAM), a memory, a read-only memory (ROM), an electrically programmable ROM, an electrically erasable programmable ROM, a register, a hard disk, a removable magnetic disk, a CD-ROM, or any other type of non-transitory computer readable recording medium commonly known in the art.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A networking activity interactive system comprising:
   a client terminal, and
   a server in communication with the client terminal and comprising:
   a computer processor and
   a non-transitory computer readable recording memory coupled to the computer processor and comprising computer processor executable instructions which, when executed, cause the computer processor to perform:
   creating and storing networking activity contents, wherein the networking activity contents comprise an activity title, activity content, activity scheduled occurrence time, activity classification, participation conditions and activity examples;
   executing a detail procedure of determining whether participant data submitted by the user is in conformity with the networking activity contents comprising: determining whether the participant data submitted by the user is in conformity with the participation conditions and the activity examples, if yes, storing the participant data submitted by the user into the participant reply volume of the networking activity, and adding the user into the participant user group of the networking activity;
   receiving requests from a user for participating in the networking activity and the participant data submitted by the user,
   determining whether the participant data submitted by the user is in conformity with the networking activity contents, if yes, adding the user into a participant user group of the networking activity and storing the participant data submitted by the user into a participant reply volume of the networking activity, if no, failing to participate in the networking activity;

presenting the networking activity contents and the participant reply content volume of the networking activity;

assigning an identification code of the networking activity, an identification code of a group that a posting corresponding to the networking activity is disposed therein, and an identification code of the post;

indexed by the identification code of the networking activity, storing the networking activity contents, the participant user group of the networking activity, the identification code of the group and the identification code of the posting into an activity information storage module;

indexed by the identification code of the group and the identification code of the post, storing the posting title, the identification code of the networking activity, and the posting contents which comprising the activity example of the networking activity and the participant reply content volume which collects the participant data submitted by the user of the networking activity into a posting information storage module; and storing the networking activity created and participated in by the user, and adding the networking activity created by the user into a networking activity creating volume of the user, adding the networking activity participated in by the user into a networking activity participating volume.

2. The networking activity interactive system of claim 1, wherein the non-transitory computer readable recording memory further comprises instructions which, when executed, cause the computer processor to perform:

receiving a networking activity creating request submitted by the user and the networking activity contents;

submitting and storing the networking activity contents into the activity information storage module and the posting information storage module;

creating a cross checking relationship between the activity information storage module and the posting information storage module for the networking activity contents; and determining whether the cross checking relationship is created successfully, if yes, adding the networking activity into the networking activity creating volume of the user activity storage module by the creating module, if no, re-submitting and storing the networking activity contents to the activity information storage module and the posting information storage module by the creating module.

3. The networking activity interactive system of claim 1, wherein the non-transitory computer readable recording memory further comprises instructions which, when executed, cause the computer processor to perform:

receiving normal reply contents about the networking activity contents submitted by the user and store the normal reply contents into the posting information storage module; and inquiring the networking activity contents and/or networking activity records of the user.

4. The networking activity interactive system of claim 3, wherein the non-transitory computer readable recording memory further comprises instructions which, when executed, cause the computer processor to perform: when inquiring the networking activity contents, receiving the corresponding networking activity contents, the activity example of the corresponding networking activity and the participant reply content volume of the networking activity, and presenting them.

5. The networking activity interactive system of claim 3, wherein the non-transitory computer readable recording memory further comprises instructions which, when executed, cause the computer processor to perform: when inquiring the networking activity records, receiving the networking activity creating volume and the networking activity participating volume of the corresponding user, and presenting them.

6. The networking activity interactive system of claim 1, wherein the computer processor executable instructions, when executed, further cause the computer processor to perform: receiving comment contents of the participant data submitted by the user in the participant reply volume of the networking activity, storing the comment contents, and presenting the comment contents.

7. A non-transitory computer readable recording medium that stores instructions which when executed by a computer comprising a processor implementing a networking activity interactive method, by performing:

creating and storing networking activity contents, wherein the networking activity contents comprise an activity title, activity content, activity scheduled occurrence time, activity classification, participation conditions and activity examples; executing a detail procedure of determining whether participant data submitted by the user is in conformity with the networking activity contents comprising: determining whether the participant data submitted by the user is in conformity with the participation conditions and the activity examples, if yes, storing the participant data submitted by the user into the participant reply volume of the networking activity, and adding the user into the participant user group of the networking activity;

receiving requests from a user for participating in the networking activity and the participant data submitted by the user, determining whether the participant data submitted by the user is in conformity with the networking activity contents, if yes, adding the user into a participant user group of the networking activity and storing the participant data submitted by the user into a participant reply volume of the networking activity, if no, failing to participate in the networking activity;

presenting the networking activity contents and the participant reply content volume of the networking activity;

assigning an identification code of the networking activity, an identification code of a group that a posting corresponding to the networking activity is disposed therein, and an identification code of the post;

indexed by the identification code of the networking activity, storing the networking activity contents, the participant user group of the networking activity, the identification code of the group and the identification code of the posting into an activity information storage module;

indexed by the identification code of the group and the identification code of the post, storing the posting title, the identification code of the networking activity, and the posting contents which comprising the activity example of the networking activity and the participant reply content volume which collects the participant data submitted by the user of the networking activity into a posting information storage module; and storing the networking activity created and participated in by the user, and adding the networking activity created by the user into a networking activity creating volume of the user, adding the networking activity participated in by the user into a networking activity participating volume.

8. The non-transitory computer readable recording medium of claim 7, further comprising instructions for:

receiving a networking activity creating request and the networking activity contents submitted by the user;

submitting the networking activity contents to the activity information storage module and the posting information storage module for storing;

creating a cross checking relationship between the activity information storage module and the posting information storage module for the networking activity contents; and determining whether the cross checking relationship is created successfully, if yes, adding the networking activity into the networking activity creating volume of the user activity storage module, if no, re-submitting and storing the networking activity contents to the activity information storage module and the posting information storage module.

9. The non-transitory computer readable recording medium of claim 8, further comprising instructions for: obtaining comment contents of the participant data submitted by the user in the participant reply volume of the network activity; storing and presenting the comment contents.

10. The non-transitory computer readable recording medium of claim 7, further comprising instructions for:

receiving normal reply contents about the networking activity contents submitted by the user;

storing and presenting those normal reply contents; and inquiring and browsing the networking activity contents and/or networking activity records of the user.

11. The non-transitory computer readable recording medium of claim 10, wherein the step of inquiring and browsing the networking activity contents comprises:

receiving the user's request of inquiring and browsing the networking activity contents;

retrieving the corresponding networking activity contents and the participant reply content volume of the networking activity according to the request of inquiring and browsing the networking activity contents; and presenting the networking activity contents and the participant reply content volume of the networking activity.

12. The non-transitory computer readable recording medium of claim 10, wherein the step of inquiring and browsing the networking activity records of the user comprises:

receiving the request of inquiring and browsing the networking activity records of the user;

retrieving the networking activity creating volume of the user and the networking activity participated in by the user according to the request of inquiring and browsing the networking activity records of the user; and presenting the networking activity creating volume and the networking activity participating volume of the user.

13. A client terminal, comprising:

a creating module comprising one or more processors configured to create networking activity contents, wherein the networking activity contents comprise an activity title, activity detail content, activity scheduled occurrence time, activity classification, participation conditions and activity examples;

an interactive module comprising one or more processors configured to receive requests from a user for participating in the networking activity and participant data submitted by the user, and compare the participant data submitted by the user with the networking activity contents, the participation conditions and the activity examples; and a presenting module comprising one or more processors configured to present the networking activity contents and the participant data submitted by the user when the participant data submitted by the user is in conformity with the networking activity contents according to the comparing result of the interactive module;

a reply module comprising one or more processors configured to receive normal reply contents submitted by the user for the networking activity contents; and a query module comprising one or more processors configured to inquire the networking activity contents and/or networking activity records of the user; wherein when the query module inquires the networking activity contents, the query module further receives the networking activity contents, the activity example of the corresponding networking activity, and the participant reply content volume of the networking activity, and presents them by the presenting module; and when the query module inquires the networking activity records of the user, the query module further receives the networking activity creating volume of the user and the networking activity volume participated in by the user, and presents them by the presenting module.

14. The client terminal of claim 13, further comprising a comment module comprising one or more processors configured to receive comment contents of the participant data submitted by the user in the participant reply volume of the networking activity, and presenting the comment contents by the presenting module; wherein the creating module assigns an identification code of the networking activity, an identification code of a group that a posting corresponding to the networking activity is disposed therein, and an identification code of the posting.

15. A server, comprising:

a database configured to store networking activity contents, a participant user group of the networking activity and a participant reply content volume which collects participant data submitted by a user; and an update module coupled to the database and comprising one or more processors configured to add the user into the participant user group of the networking activity, storing the participant data submitted by the user into the participant reply content volume of the networking activity, while the participant data submitted by the user is in conformity with the networking activity contents, wherein the database comprises:

an activity information storage module indexed by an identification code of the networking activity comprising one or more processors configured to store the networking activity contents, the participant user group of the networking activity, the identification code of a group and an identification code of a post;

a posting information storage module indexed by the identification code of the group and the identification code of the posting comprising one or more processors configured to store the posting title, the identification code of the networking activity and the posting contents which comprising the activity example of the networking activity and the participant reply content volume which collects the participant data submitted by the user of the networking activity; and a user activity storage module comprising one or more processors configured to store the networking activity created and participated in by the user, add the networking activity created by the user into the networking activity creating volume of the user, and add the networking activity participated in by the user into the networking activity participating volume of the user;

wherein the networking activity contents comprise an activity title, activity detail content, activity scheduled occurrence time, activity classification, participation conditions and activity examples.

* * * * *